United States Patent [19]

Zien

[11] 4,245,454
[45] Jan. 20, 1981

[54] LINE METERING APPARATUS

[75] Inventor: Gerald J. Zien, Prior Lake, Minn.

[73] Assignee: The Toro Company, Minneapolis, Minn.

[21] Appl. No.: 11,142

[22] Filed: Feb. 12, 1979

[51] Int. Cl.³ .................... A01D 55/18; A01D 55/26
[52] U.S. Cl. ....................................... 56/12.7; 30/276
[58] Field of Search .................... 56/295, 12.7; 30/276

[56] References Cited

U.S. PATENT DOCUMENTS

| 2,709,323 | 5/1955 | Swan | 51/335 |
|---|---|---|---|
| 3,664,102 | 5/1972 | Reber | 56/295 |
| 3,708,967 | 1/1973 | Geist et al. | 56/12.7 |
| 3,826,068 | 7/1974 | Ballas et al. | 56/12.7 |
| 3,928,911 | 12/1975 | Pittinger, Jr. | 56/12.7 |
| 4,024,635 | 5/1977 | Mizuno et al. | 56/12.7 |
| 4,077,191 | 3/1978 | Pittinger, Sr. | 56/12.7 |
| 4,091,536 | 5/1978 | Bartholomew | 56/12.7 |
| 4,104,796 | 8/1978 | Sheldon | 56/295 |
| 4,134,204 | 1/1979 | Perdue | 56/12.7 |
| 4,138,810 | 2/1979 | Pittinger, Sr. et al. | 56/12.7 |
| 4,151,646 | 5/1979 | Lane | 56/12.7 |
| 4,168,572 | 9/1979 | Ewing | 56/12.7 |
| 4,169,311 | 10/1979 | Evenson et al. | 56/12.7 |

FOREIGN PATENT DOCUMENTS 852150 7/1977 Belgium ................... 56/12.7

OTHER PUBLICATIONS

Advertise Brochure of Advance Engine Products, form 1-77-G.
Page 5 of Instruction Manual, Model ST-1024 for Spintrim Edger/trimmer.

Primary Examiner—Paul J. Hirsch
Attorney, Agent, or Firm—Merchant, Gould, Smith, Edell, Welter & Schmidt

[57] ABSTRACT

A device (10) for metering discrete lengths of filament utilized in a flexible filament vegetation cutting device is disclosed. The line metering device (10) is preferably used in flexible filament lawn mowers. An electric motor (28) rotatively drives a drive shaft (32) about its axis. A driving mechanism, preferably a spool (36) is coupled to the drive shaft (32) for rotation therewith whenever the drive shaft (32) is rotated. A driven mechanism, preferably a guide drum (84), is selectively coupled for rotation to the driving mechanism (36). The spool (36) has the flexible filament (66) wound about it and is coupled to one of the driven and driving mechanisms (84, 32) for rotation therewith. The metering mechanism includes a device (172) for rapidly decelerating the rotating drive shaft (32) and driving mechanism (36), together with a device (54) for disengaging the guide drum mechanism (84) from the spool (36) during the rapid deceleration whereby the guide drum (84) is free to rotate a discrete amount relative to the spool (36). In this manner a length of filament (66) is metered from the spool (36).

25 Claims, 15 Drawing Figures

LINE METERING APPARATUS

TECHNICAL FIELD

The present invention relates broadly to the field of filament cutting devices. More particularly, the present invention relates to devices for metering a length of flexible filament from a spool member in such a device.

BACKGROUND OF THE PRIOR ART

Flexible filament cutting elements often become worn, frayed or broken as a result of normal usage. Their effective cutting lengths are thereby shortened. Therefore, it is necessary to provide apparatus for uncoiling, playing out or otherwise providing a new length of flexible filament cutting element to replace the lengths which become unusable under normal operating conditions. The prime mover for the cutting devices can be either a light weight electric motor or gasoline engine. Excessive flexible filament cutting element length increases the probability of electric motor burn-out when such as electric motor is utilized. Thus, it is desirable to provide an apparatus which permits the play-out of the flexible cutting element to predetermined discrete increments and which furthermore maintains the flexible filament cutting element length less than a predetermined maximum.

Devices are known in the prior art for metering a length of the flexible filament cutting element. In one such device, a flexible cutting line is wound about a spool. The spool has a square recess and is spring biased into a position where it engages a square-headed bolt secured to a motor shaft. When it is necessary to uncoil additional cutting line, the device is de-energized and allowed to stop rotating. Then, the spool is manually depressed against the biasing force of the spring to disengage the bolt and recess. The spool is then free to turn. Upon release, it may again engage the bolt head. The operator rotates the spool until he judges that the necessary additional length of flexible line has been removed from the coil.

Another filament line metering device is disclosed in a patent application of Henry B. Tilliston which is entitled "Line Metering Apparatus", filed on Aug. 13, 1976 under Ser. No. 714,013 and assigned to the same corporation to which this application is assigned. The apparatus disclosed therein meters discrete lengths of filament from a filament holder or spool in an edging and trimming device.

The line metering is specifically accomplished in the aforesaid Tilliston application through the use of a spool on which the filament is wound, and which is mounted for both axial and rotational movement relative to the rotating drive shaft. The drive shaft carries a drive gear having teeth which project radially outward. The filament holder carries a driven gear having first and second sets of gear teeth which project radially inward for selective engagement with the drive gear teeth. The two sets of driven gear teeth are spaced axially from each other and rotationally staggered a predetermined angular amount. The filament holder is normally axially biased so that the drive gear teeth engage the upper set of driven gear teeth.

When the free filament end becomes worn or broken, additional filament may be metered by tapping the lower surface of the filament holder on the ground, which moves the filament holder upward axially against the bias of the spring until the drive gear teeth move out of engagement with the first set of driven gear teeth and into engagement with the second set of driven gear teeth. As this happens, the staggered relation of the driven gear teeth sets causes limited relative rotational movement of the spool relative to the drive shaft, which causes a predetermined length of filament to unwind. After the tapping force is removed, the spool returns to its original state and an additional length of filament unwinds in the same manner. The line metering mechanism disclosed in the Tilliston application is particularly suitable for use in an edging and trimming device which is generally intended to be carried and which therefore lends itself to the "tapping" approach for filament metering. Such a "tapping" approach, however, is not particularly suitable for line filament lawn mowers. This is true because rotary lawn mowers are generally wheeled, which of course is intended to preclude elevational movement of the lawn mower relative to the ground during operation. Thus, axial movement of a filament spool from the bottom of the lawn mower to effect filament metering during the cutting operation is not feasible.

Another line metering device, which is particularly suitable for use in rotary line filament lawn mowers is disclosed in the patent application Ser. No. 821,145 of James R. Bowman et al which is entitled "Line Feed Mechanism for Filament Mower", filed on Aug. 2, 1977, and assigned to the same corporation to which this application is assigned.

The line metering apparatus disclosed in the Bowman et al application accomplishes the line metering by maintaining the filament spool in an axial stationary position while at the same time mounting the spool for rotation relative to a drive member. The drive member is rotatably driven and axially movable between first and second axial positions. In each axial position the drive member is in driving engagement with a driven member secured to the spool. The drive and driven members are constructed so that, as the drive member moves from one axial position to the other, the driven member rotates a limited amount relative to the drive member in a direction which permits filament to centrifugally unwind from the spool.

Metering is thus accomplished by axially moving the drive member between its axial positions relative to the driven member and spool. A means is provided for affecting axial movement of the drive member as it rotates. This is accomplished through means for mounting having the drive member to the drive shaft so that the drive member always rotates with the drive shaft but is axially moveable thereto. An actuating member, preferably taking the form of an indexing sleeve, is mounted in opposition to the rotating drive member. The actuating member is essentially stationary from the standpoint of rotation, but is axially movable through camming structure which is manually controlled by the lawn mower operator. Rotatable bearing means are disposed between the actuating member and drive member, permitting axial shifting to occur even though the drive member rotates at substantial rotational velocity relative to the actuating member.

SUMMARY OF THE INVENTION

The present invention is directed to an apparatus for metering discrete lengths of filament in a vegetation cutting device in which the flexible filament is rotatably driven about a substantially vertical axis with a free end of the filament defining a cutting plane. The apparatus includes a drive shaft means which is rotatably driven about the vertical axis. A driving means is coupled to the drive shaft for rotation therewith whenever the drive shaft is rotated. Driven means is selectively coupled to the driving means for selective rotation therewith. Spool means upon which flexible filament may be wound is coupled to one of said driven and driving means for rotation therewith. Means for metering discrete lengths of filament from the spool means is provided. The metering means includes means for rapidly decelerating the drive shaft means and driving means, and also includes a means for disengaging the driven means from the driving means during the rapid deceleration of the driving means.

In a preferred embodiment, a biasing means biases the driven means into driving engagement with the driving means during normally acceleration and deceleration at rates less than caused by the decelerating means. The spool means is drivingly coupled to the drive shaft to form a portion of the driving means. The driving means includes a plurality of first teeth extending from the spool means. A plurality of second teeth extend from the driven means for driving engagement with the plurality of first teeth. The disengaging means includes ramp means adjacent to each of the first teeth for guiding each of the second teeth out of driving engagement with the first teeth during the rapid deceleration caused by the decelerating means. A stop means is provided for stopping the relative rotation between the spool means and the driven means at a discrete angular distance after the disengagement of the first and second teeth. The present invention thus does not require the mechanical tapping of the cutting device upon the ground or the use of complex mechanical linkages to move a drive member relative to a driven member. The present invention, rather, utilizes a simple decelerating or braking means to brake a drive member in combination with a disengaging means which utilizes the rotational inertia of the driven member to cause a discrete amount of filament to be played out.

Various advantages and features of novelty which characterize the invention are pointed out with particularity in the claims annexed hereto and forming a part hereof. However, for a better understanding of the invention, its advantages, and objects obtained by its use, reference shold be had to the drawings which form a further part hereof, and to the accompanying descriptive matter, in which there is illustrated and described preferred embodiments of the invention.

DETAILED DESCRIPTION OF THE INVENTION

Figures 1, 2, 3:
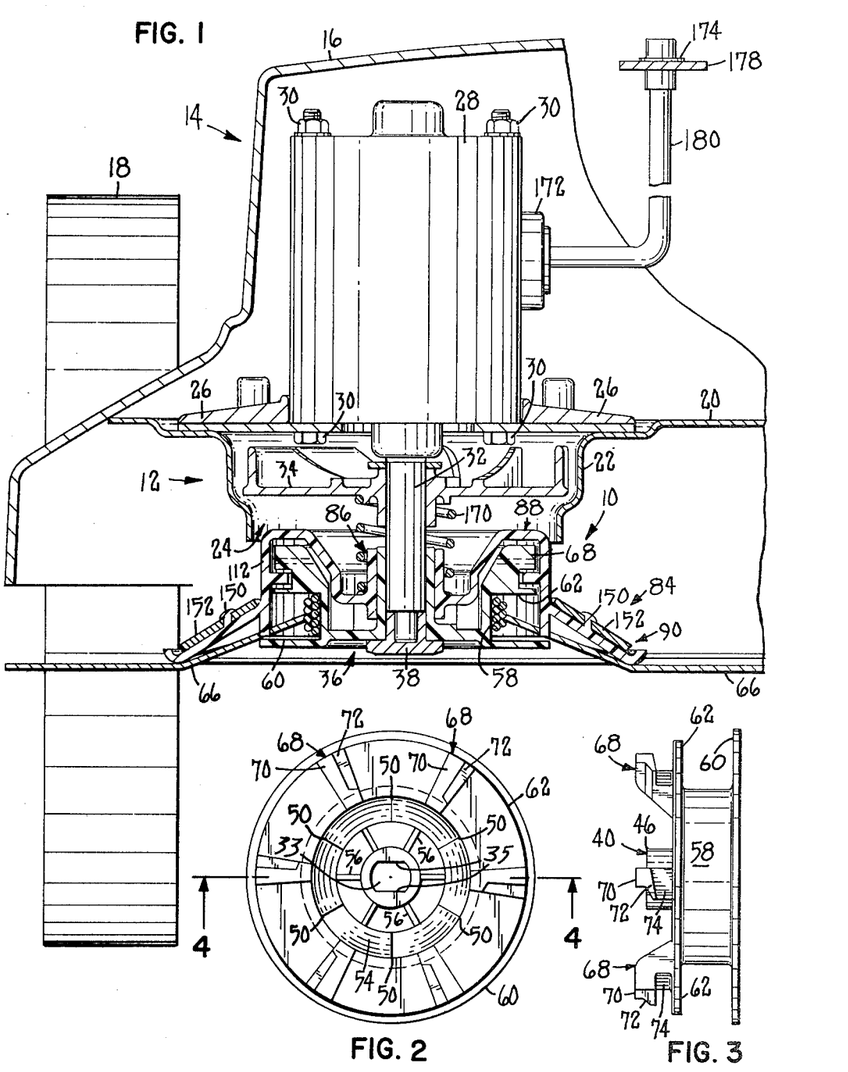
FIG. 1 is a front sectional view through a portion of a filament lawn mower, illustrating a line metering mechanism in accordance with the present invention.
FIG. 2 is a top plan view of a spool means in accordance with the present invention.
FIG. 3 is a side elevational view of the spool means.

Referring to the drawings in detail, wherein like numerals indicate like elements, there is shown in FIG. 1 a line metering apparatus in accordance with the present invention designated generally as 10. The line metering apparatus 10 is used on a flexible filament vegetation cutting device 12. A portion of a lawn mower 14, with which the cutting device 12 is preferably used, is shown in FIG. 1. The lawn mower 14 includes an outer housing 16 which is carried out a ground surface by a plurality of wheels, one of which is shown as 18. A cross member 20 is attached within the housing 16. The cutting device 12 including the line metering apparatus 10, are attached to the cross member 20.

A generally cylindrical shroud 22 extends downwardly from the cross member 20 and has a central opening 24 for receiving portions of the cutting device 12. A flange 26 is attached to the cross member 20 adjacent to the shroud 22. An electric motor 28 is attached to the flange 26 by conventional means, such as nuts and bolts 30. A drive shaft 32 is drivingly coupled to the electric motor 28 and is rotatably driven thereby. A fan member 34 is fixedly attached to the drive shaft 32 to draw air over the motor 28 for cooling purposes. The electric motor 28 is connected to a source of electric current in any suitable conventional manner.

A spool means 36 is removably attached to the drive shaft 32 by a nut 38. The spool means has a centrally located hole 33. The hole 33 has a pair of opposed flat surfaces 35. A pair of opposed flat surfaces on the drive shaft 32 mates or keys with the surfaces 35. The nut 38 securely fastens the spool means 36 to the drive shaft 32. Since the spool means 36 and the drive shaft 32 are keyed to one another, the spool means 36 rotates together with the drive shaft 32 whenever the drive shaft 32 is rotated.

Figures 4, 5, 6, 7:
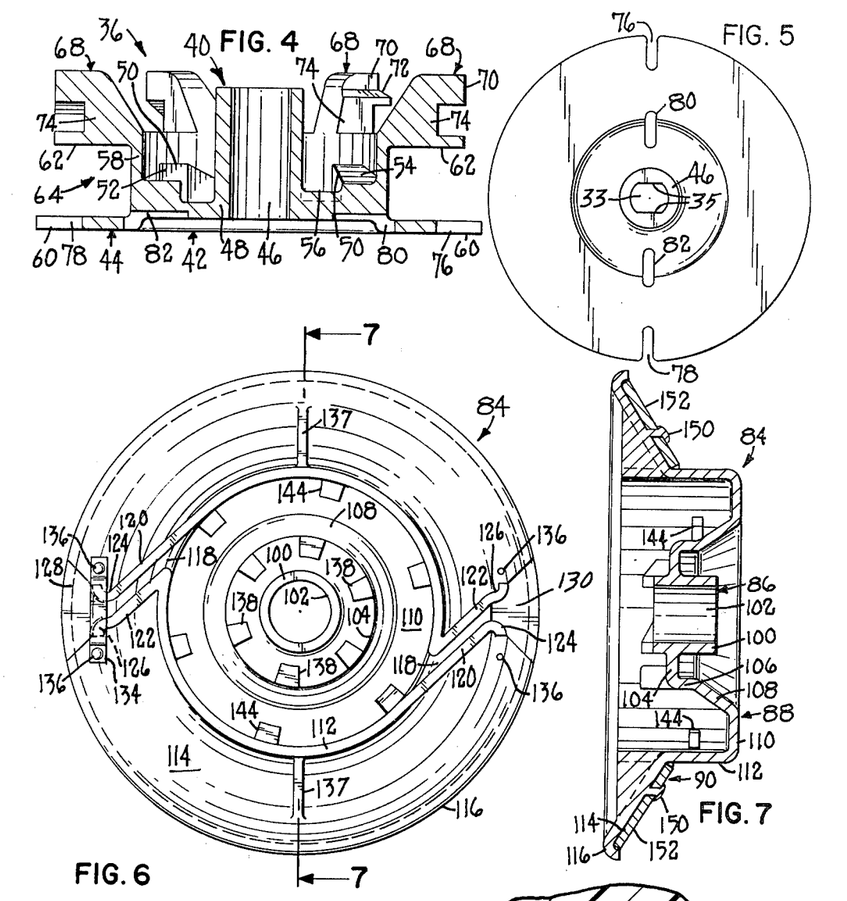
FIG. 4 is a sectional view taken along line 4—4 of FIG. 2.
FIG. 5 is a bottom plan view of the spool means.
FIG. 6 is a bottom plan view of a driven means, which takes the form of a guide drum.
FIG. 7 is a view taken along line 7—7 of FIG. 6.
Figure 8:
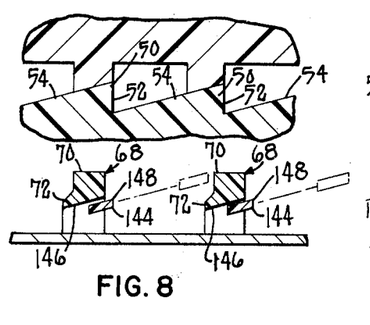
FIG. 8 illustrates the first and second teeth out of driving engagement with one another, together with the relative positioning of the stop means.
Figure 9:
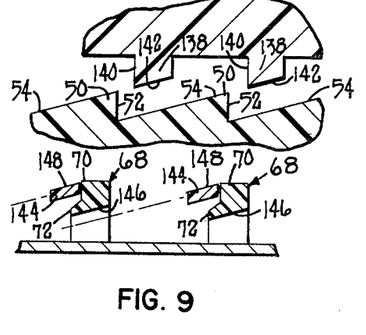
FIG. 9 illustrates the first and second teeth at their furthest discrete angular rotation, together with the stop means engaged.

As is best seen in FIG. 4, the spool member 36 is made up of a central cylindrical section 40, a medial section 42, and an outer circumferential section 44. The spool means 36 is preferably formed of an integral piece of hard plastic material. The central cylindrical section 40 takes the form of a longitudinally extended cylinder 46 which is received about the drive shaft 32. The medial section 42 extends radially outward from a lower end 48 of the cylinder 46. The medial section 42 includes a set or plurality of first teeth 50 extending upwardly and spaced at generally equiangular distances. In the embodiment shown, six teeth 60 are spaced at approximately 60° intervals. Each of the teeth 50 has a generally vertically extending engaging surface 52. An upwardly extending surface 54 forms a ramp means which extends upwardly from adjacent engaging surface 52 in the direction of rotation of the spool means 36, that is, to the right in FIGS. 8-11. A plurality of strengthening ribs 56 extend between the teeth 50 and the cylinder 46. The ribs 56 provide additional structural integrity to the spool means 36.

The outer circumferential section 44 includes a cylindrical wall 58, a bottom flange 60, and a top flange 62. A filament receiving area 64 is formed between the flanges 60, 62 and the wall 58. One or more lengths of a flexible filament 66 are wound within the area 64. A plurality of first stop members 68, whose function will be explained more fully hereinafter, are connected to and extend upwardly from the cylindrical wall 58 and top flange 62. The stop members 68 are equal in number to the teeth 50 and are also spaced at equiangular 60° intervals. Each of the first stop members 68 has an abutment section 70, a downwardly sloping ramp section 72 extending from one side of the abutment section 70, and a connecting section 74 which connects the stop member 68 to the top flange 62 and the cylindrical wall 58. A slit 76 extends radially inward from the outer edge of the bottom flange 60. A second slit 78 extends radially inward of the outer edge of the bottom flange 60 at a location disposed 180° from the first slit 76. A slot 80 is formed through the bottom of flange a short distance radially inward of the slit 76 and along a radial line in alignment with the slit 76. A corresponding slot 82 is formed through the bottom flange 60 adjacent the slit 78. An innermost end of the filament 66 is passed through the slot 80 to aid in the attachment of the filament 66 to the spool means 36. Another length of filament 66 can be attached through the slot 82.

A guide drum 84 is disposed in a generally overlying relationship about the spool means 36. The guide drum 84 is preferably formed of a hard plastic material and includes a central cylindrical section 86, a medial section 88, and an outer downwardly sloping guide section 90. The central section 86 is formed of a cylinder 100 which has an inner surface 102. The inner surface 102 has a diameter slightly larger than the outer diameter of the cylinder 46. In this manner, the guide drum 84 is free to rotate relative to the support means 36.

The medial section 88 includes an inner annular disc portion 104, an inner cylindrical portion 106, a frusto-conical portion 108, an outer annular disc portion 110, and an outer cylindrical portion 112. The inner annular disc portion 104 extends generally radially outward and perpendicularly from the cylinder 100. The inner cylindrical portion 106 extends upwardly from an outer edge of the disc portion 104. The frusto-conical portion 108 extends generally upwardly and outwardly from an upper edge of the cylindrical portion 106. The outer annular disc portion 110 extends outwardly from an upper edge of the frusto-conical portion 108 and the outer cylindrical portion 112 extends generally downwardly from an outer edge of the disc portion 110. In this manner, the portions 106, 108, 110, 112 form a receiving area for the top flange 62 and the first stop members 68. As best seen in FIG. 1, the cross sectional configuration of the portions 106-112 has a mating contour to that of the top flange 62 and first top members 68. Also, as seen in FIG. 101, the outer cylindrical portion 112 extends downwardly below the top flange 62 and terminates adjacent to the lower flange 60. The lower flange 60 has a larger diameter than the top flange 62. The bottom flange 60 extends radially outward to the outer cylindrical portion 112 in order to prevent the entry of dirt, grass particles and the like into the filament receiving area 64.

The guide section 90 of the guide drum 86 includes a frusto-conical portion 114 which extends downwardly and outwardly from an outer surface of the cylindrical portion 112 and an upwardly curved lip portion 116 at the lower outer circumferential edge of the guide drum 84. A pair of gaps or line outlets 118 are formed through the outer cylindrical portion 112. A pair of line guide walls 120, 122 extend from the cylindrical portion 112 on either side of each gap 118. A curved guide member 124 extends from the radial outward end of each guide wall 120 and a curved guide member 126 extends from each guide wall 122. The guide members 124, 126 serve as curved bearing points for filament 66 exiting the guide drum 84. To prevent premature wear of the guide drum 84 at the points of contact between the filament 66 and the drum 84, a wear plate 128 is attached to a bottom surface of the guide drum 84 adjacent the guide members 124, 126. Only a single wear plate 128 is shown on the left side of FIG. 6. A recess 130 which has the general shape of the bottom of the wear plate 128 is shown on the right side of FIG. 6. Each wear plate 128 is received within a recess 130. The recesses 130 have sufficient depth so that each wear plate 128 fits flush to remainder of the bottom surface of the guide drum 84. Each wear plate 128 has a base which lies flush within one of the recesses 130 and a pair of curved uprights. Each curved upright fits flush around one of the guide members 124, 126. Each wear plate 128 is secured in position by a line retainer 132. Each line retainer 132 has a generally inverted U-shaped configuration. A pair of legs or attachment plates 134 forms the base of the retainers 132. A peg or post 136 extends from the bottom surface of the frusto-conical portion 114 and passes through a hole in each of the legs 134 to stake the line retainer 132 to the guide drum 84. The line retainer 132 serves to secure the wear plate 128 to the guide drum 84 and also to hold the line 66 between the guide members 124, 126. A pair of strenghtening ribs 137 extend between the cylindrical portion 112 and the bottom surface of the frusto-conical portion of 114 in order to give additional strength to the guide drum 84.

Figure 10:
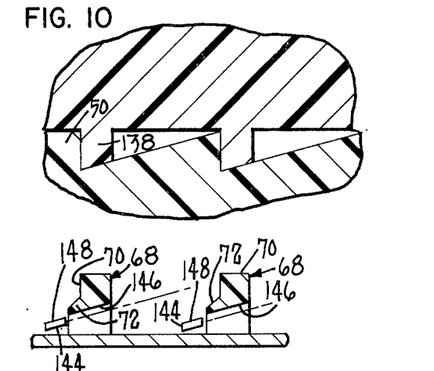
FIG. 10 illustrates the first and second drive teeth in driving engagement, together with the relative placement of the stop means.

A plurality of second teeth 138 extends downwardly from the inner annular disc portion 104 of the medial section 88. Each of the teeth 138 has an engagement or abutment surface 140 and a ramp or guide surface 142. As seen in FIG. 10 the abutment surface 140 of the second teeth 138 engages the engaging surface 52 of the first teeth 50 when the guide drum 84 is driven. The guide surface 142 slants upwardly away from the abutment surface 140 in the direction of rotation of the guide drum 84. The slant of the guide surface 142 is approximately the same as the slant of the upwardly extending surface 54. As will be explained more fully hereinafter, the surface 54 serves to guide the second teeth 138 upwardly out of engagement with the first teeth 50.

A plurality of second stop members 144 extends radially inward from an inner surface of the cylindrical wall 112. As seen in FIGS. 8-11, each first stop member 68 has a bottom surface 146. The bottom surface 146 is slanted upwardly in the direction of rotation of the support means 36 and the guide drum 84. The second stop members 144 similarly have top surfaces 148 slanged upwardly. The support means 36 and the guide drum 84 are so disposed that the top surface 148 passes below the bottom surface 146 during relative rotation between the support means 36 and the guide drum 84.

A generally frusto-conical shaped ring 152 is secured to a top surface of the portion 114 of the guide drum 84. A plurality of pegs or posts 150 extends upwardly from a top surface of the frusto-conical portion 114. The ring 152 has a plurality of holes extending through it for receiving the posts 150. In this manner the ring 152 is secured or staked to the guide drum 84. The ring 152 is preferably made of a metal material to add mass to the guide drum 84. The purpose of providing additional mass will be explained more fully in the description of the operation of the apparatus.

Figures 12, 13, 14, 15:
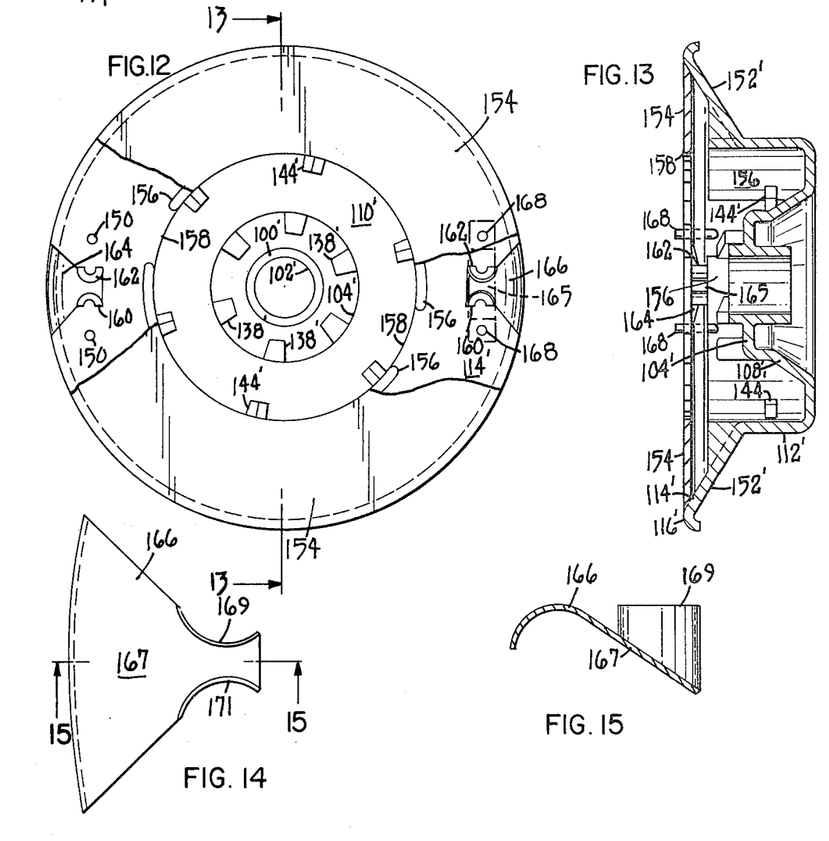
FIG. 12 is a bottom plan view of a guide drum having various alternate parts.
FIG. 13 is a view taken along line 13—13 of FIG. 12 and has been rotated 180° clockwise.
FIG. 14 is an enlarged top plan view of a wear plate.
FIG. 15 is a view taken along line 15—15 of FIG. 14.

A guide drum 84' is shown in FIG. 12. The guide drum 84' has a number of alternate parts, which will be identified by new numerals. Parts of the guide drum 84' which are similar to the guide drum 84 will be indicated by primed numerals. A generally flat annular ring 154 is attached along the bottom surface of the guide drum 84'. The ring 154 is utilized in place of the ring 152 to increase the mass of the guide drum 84'. An outer cylindrical portion 156 forms a portion of the medial section of the guide drum 84' and has a pair of gaps or line outlets 158 formed in it at 180° intervals. No line guide walls extend radially outward from the cylindrical portion 156. A pair of curved guide members 160, 162 are formed integral with the guide drum 84' and extend downwardly from the bottom surface of the frusto-conical portion 114'. A recess 164 is formed adjacent to each pair of guide members 160, 162. A wear plate 166 is received within each of the recesses 164 and is secured thereto by a line retainer 165 which is held in position by staking upon a pair of posts 168 that extend downwardly from the frusto-conical portion 114'. As seen in FIGS. 14 and 15, the wear plate 166 has a base 167 and a pair of curved uprights 169, 171. The guide members 160, 162, the wear plate 166, and the line retainer 165 perform the same function as the corresponding parts in the drum 84. Each of the various alternate parts shown with the guide drum 84' can be substituted for the corresponding portions in the guide drum 84, without changing the other portions of the guide drum 84. For instance, the guide walls 120, 122 may be omitted from the guide drum 84 which still utilizing the frusto-conical ring 152, or the guide walls 120, 122 can be retained in the guide drum 84 while the ring 154 can be substituted for the ring 152.

The guide drum 84 is generally received about the support means 36. A spring 170 is received about the drive shaft 32 and the inner cylindrical portion 106. A top end of the spring 170 contacts a bottom surface of the fan member 34 and a bottom end of the spring 170 contacts a top surface of the inner annular disc portion 104 of the guide drum 84. In this manner, the spring 170 biases the guide drum 84 downwardly against the spool means 36. The first and second set of teeth 50, 138 are thus biased into engagement as shown in FIG. 10.

A braking or decelerating means is shown diagramatically as 172. Upon actuation, the decelerating means 172 rapidly decelerates the drive shaft 32, and hence, the spool means 36. The deceleration caused by the decelerating means 62 is at a rate much more rapid than the normal deceleration of the drive shaft 32 when the motor 28 is turned off. For example, the decelerating means 172 can bring the drive shaft 32 to a complete stop within approximately 0.3 seconds. The braking means 172 can be any conventional electric motor braking mechanism. A number of braking mechanisms are known in the art and, hence, the braking means 172 will not be described in detail. Also shown diagramatically is an actuator switch 174 for activating the decelerating means 172. The actuator switch 174 may be attached to an accessible portion 178 of the lawn mower 14 and connected to the decelerating means 172 by conductors 180.

Operation

When the filament lawn mower 14 is performing a cutting operation, the drive shaft 32 is rotated at a high speed, for example 8,000 rpm, by the electric motor 28. During the cutting operation, the first and second sets of teeth 50, 138 engage one another as shown in FIG. 10 and in phantom line in FIG. 11. The portions of the apparatus 10 are moving from left to right in FIG. 10. Assuming that an additional line filament is not needed and the motor 28 is merely shut off, the shaft 32 decelerates at a rate less than would be caused by the decelerating means 172. During such an operation, the spring 170 maintains the guide drum 84 and the spool means 36 in the engaged driving condition shown in FIG. 10.

When an additional length of the filament 66 is required, the decelerating means 172 is activated by the switch 174 while the shaft 32 is rotating. The shaft 32 and the spool means 36 are thus rapidly decelerated. However, the guide drum 84 is keyed for rotation with the spool means only by the engagement of the first and second teeth 50, 138. The guide drum 84 is thus free to continue rotation in the driving direction. The inertia of the guide drum 84 causes the guide drum 84 to continue rotation during the rapid deceleration. It has been found that when the guide drum 84 is constructed of plastic, rings 152 or 154 are desirable to increase the mass of the guide drum 84 in order to assure that the guide drum 84 has sufficient inertia to continue rotation during the rapid deceleration of the spool means 36.

Figure 11:
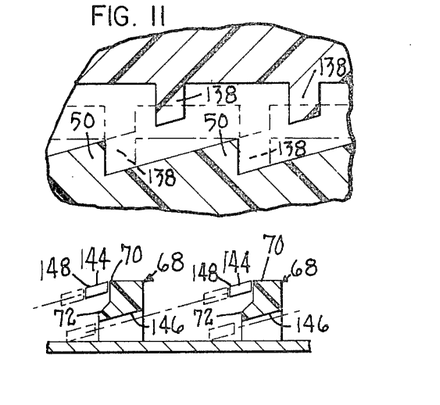
FIG. 11 illustrates the sequence of movement of the first and second teeth and the stop means.

The surface 54 guides the guide drum 84 upwardly during the continued rotation. The first and second teeth 50, 138 thus disengage from one another and the second stop members 144 rotate and move upwardly below the lower surface 146 of the first stop members. See FIG. 8. The relative rotation between the guide drum 84 and the support means 36 continues until the second stop member 144 engages the abutment section 70 of the first stop member 68. The guide drum 84 at this point has rotated a sufficient amount for the teeth 138 to be over the next successive teeth 50. See FIG. 9 and the full line of FIG. 11. Thereafter, the guide drum 84 is forced downwardly and guided by the ramp section 72 so that the teeth 138 engage the next successive teeth 50. See the phantom line of FIG. 11. FIG. 11 illustrates the relative positioning of the teeth 50, 138 and the stop members 68, 144 at various points of relative rotation between the spool means 36 and the guide drum 84. In this manner, the guide drum 84 is rotated a discrete amount relative to the support means 36 and a discrete amount of filament 66 is played out. As is obvious from the above description the amount of biasing force supplied by the spring 170 must be sufficient to keep the guide drum 84 in engagement with the spool means 36 during the normal deceleration of the drive shaft 32 but must be light enough to permit relative rotation between the guide drum 84 and the spool means 36 during rapid deceleration caused by the decelerating means 172.

While preferred embodiments of the present invention have been described above, certain variations should be considered within the scope of the invention. For example, while the guide drum 84 has been illustrated as the driven means and the spool means has been illustrated as a driving means, these functions could be reversed. Also, while in the preferred embodiment, the apparatus 10 has been illustrated in use with a lawn mower, it should be obvious that the apparatus 10 could be used in other types of line filament vegetation cutters. Also, the spring 170 could be precisely selected so that the biasing force of the spring 170 would return the first and second teeth 50, 138 into engagement after the relative rotation of the guide drum 84 and the spool means 36 without the use of the first and second stop members 68, 144.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size and arrangement of parts, within the principle of the invention, to the full extent extended by the broad general meaning of the terms in which the appended claims are expressed.

I claim:

1. In a vegetation cutting device in which a flexible filament is rotatably driven about a substantially vertical axis with a free end of the filament defining a cutting plane, apparatus for metering discrete lengths of the filament comprising:
   driving means for rotatably driving the flexible filament;
   driven means selectively coupled to said driving means for selective rotation therewith;
   spool means upon which flexible filament may be wound, said spool means being coupled to one of said driven and driving means for rotation therewith;
   means for metering discrete lengths of filament from said spool means;
   said metering means including means for rapidly decelerating said driving means, and means for disengaging said driven means from said driving means during rapid deceleration caused by said decelerating means whereby said driven means is free to rotate a discrete amount relative to said driving means and to thereby play out a length of filament from said spool means; and
   biasing means for biasing said driven means into driving engagement with said driving means during normal acceleration and deceleration at rates less than caused by said decelerating means.

2. An apparatus in accordance with claim 1 wherein said spool means forms a portion of said driving means, said driving means including a plurality of first teeth extending from said spool means, and a plurality of second teeth extending from said driven means for driving engagement with said plurality of first teeth.

3. An apparatus in accordance with claim 2 wherein said disengaging means includes ramp means adjacent each of the first teeth for guiding said second teeth out of driving engagement with said first teeth during the rapid deceleration caused by said decelerating means whereby said spool means and said driven means rotate relative to one another.

4. An apparatus in accordance with claim 3 including stop means for stopping the relative rotation between said spool means and said driven means at a discrete angular distance after the disengagement of said first and second teeth.

5. An apparatus in accordance with claim 4 wherein said stop means includes a first stop member extending from said spool and a second stop member extending from said driven member, said first and second stop members being axially displaced from one another during the driving engagement of said first and second plurality of teeth and coming into engagement with one another after said ramp means guides said first and second teeth out of engagement with one another during said rapid deceleration.

6. An appartus in accordance with claim 5 wherein said stop means includes a plurality of said first stop members spaced at equiangular intervals around said spool and a plurality of said second stop members equal in number to said first stop members and spaced at equiangular intervals around said driven member.

7. An apparatus in accordance with claim 5 or 6 wherein each ramp means is slanted upwardly in the direction of rotation of said spool means and wherein each first stop member includes a slanted ramp section and an abutment section, said ramp section sloping downwardly away from said abutment section in substantially the same direction as said ramp means, said second stop members being attached to said driven member and contacting said abutment section of said first stop member during said rapid deceleration.

8. An apparatus in accordance with claim 7 wherein said spool means is comprised of a central cylindrical shaped section for coupling to a drive shaft of said driving means, a medial section from which said first plurality of teeth extend, and an outer circumferential section having a top and bottom flange extending radially outward from said medial section and defining therebetween a filament receiving area, each first stop member extending upwardly from said top flange.

9. An apparatus in accordance with claim 8 wherein said driven means is comprised of a guide drum disposed in an overlying relationship to said spool means for guiding filament from said spool means radially outward.

10. An apparatus in accordance with claim 9 wherein said guide drum includes a central cylindrical section for rotatably receiving said cylindrical section of said spool means, a medial section having said second teeth and said second stop members extending therefrom, and an outer downwardly sloping guide section.

11. An apparatus in accordance with claim 10 wherein the first teeth of said spool means are formed at an axial location between said top and bottom flanges of said outer circumferential section, and each first stop member includes a connecting section extending between the ramp section of said stop member and said top flange, each connecting section having a radial outermost surface spaced radially inward from the radially outermost surfaces of both said top flange and said ramp section to form a gap between a free bottom surface of said ramp section and said top flange.

12. An apparatus in accordance with claim 11 wherein the free bottom surface of each ramp section is slanted upwardly in the direction of rotation of said spool means, each second stop member being slanted upwardly in the direction of rotation of said spool means, and each second stop member having a top surface disposed below the lowermost axial extent of said free bottom surface when said first and second teeth are in driving engagement and passing below said free bottom surface during the relative rotation of said spool means and said driven means.

13. An apparatus in accordance with claim 2 wherein said spool means and said driven means are formed of plastic material and including means attached to said driven means to increase the mass of said driven means.

14. An apparatus in accordance with claim 10 wherein said spool means and said guide drum are formed of plastic material and including means for increasing the mass of said guide drum.

15. An apparatus in accordance with claim 14 wherein said mass increasing means includes a generally frusto-conical shaped member attached to a surface of the downwardly sloping guide section of said guide drum.

16. An apparatus in accordance with claim 14 wherein said mass increasing means includes a generally ring shaped member attached to a lower end of said guide drum and extending substantially below the area of said downwardly sloping guide section.

17. In a vegetation cutting device in which a flexible filament is rotatably driven about a substantially vertical axis with a free end of the filament defining a cutting plane, apparatus for metering discrete lengths of the filament comprising:

driving means for rotatively driving said cutting device;

a drive shaft rotatably driven by said driving means about said vertical axis;

spool means upon which flexible filament may be wound, said spool means being coupled to said drive shaft for rotation therewith whenever said drive shaft is rotated, said spool means having a plurality of first teeth extending therefrom;

a guide drum received generally about said spool means for guiding said free end of the filament radially outward from said spool means, said guide drum including a plurality of second teeth extending therefrom for selective coupling to the first teeth of said spool means whereby said guide drum is selectively rotated;

means for metering discrete lengths of filament from said spool means, said metering means including means for rapidly decelerating said drive shaft and said spool means, and means for disengaging said first teeth from said second teeth during the rapid deceleration caused by said decelerating means whereby said guide drum is free to rotate a discrete amount relative to said driving means and to thereby play out a length of filament from said spool means; and biasing means for biasing said guide drum downwardly from said spool means whereby said first and second teeth are in driving engagement during normal acceleration and deceleration at rates less than caused by said decelerating means.

18. An apparatus in accordance with claim 17 wherein said disengaging means includes ramp means extending upwardly from an abutment surface of each of said first teeth for guiding said second teeth axially upwardly out of engagement with said first teeth.

19. An apparatus in accordance with claims 17 or 18 including stop means for stopping the relative rotation between said guide drum and said spool means during the rapid deceleration caused by said decelerating means after a discrete angular relative rotation has taken place.

20. An apparatus in accordance with claim 19 wherein said stop means includes a plurality of stop members extending from said spool means at a first axial location during the driving engagement of said first and second teeth, and a plurality of second stop members extending from said guide drum at a second axial location spaced axially from said first axial location during said driving engagement, said second stop members being moved axially upward into engagement with said first stop members during the rapid deceleration of said spool means whereby the relative rotation between said guide drum and said spool means is stopped after a discrete amount of angular relative rotation between the guide drum and the spool means.

21. In a vegetation cutting device in which a flexible filament is rotatably driven about a substantially vertical axis with a free end of the filament defining a cutting plane, apparatus for metering discrete lengths of the filament comprising:

electric motor means for rotatably driving said cutting device;

a drive shaft coupled to said motor means for driven rotary motion about said vertical axis;

spool means upon which flexible filament may be wound, said spool means having a central cylindrical section drivingly coupled to said drive shaft for rotary motion therewith whenever said drive shaft is rotated, a medial section extending radially outward from said central cylindrical section, said medial section including a plurality of first teeth extending upwardly therefrom, and an outer circumferential section spaced radially outward from said medial section and having a bottom flange, a cylindrical wall and a top flange forming a filament receiving area therebetween;

a guide drum received generally about said spool means for guiding said free end of the filament radially outward from said spool means, said guide drum having a central cylindrical section received about the central cylindrical section received about the central cylindrical section of said spool means, a guide drum medial section including a plurality of second teeth for selective driving engagement with said first teeth, and an outer frusto-conical guide section;

means for metering discrete lengths of filament from said spool means, said metering means including means for rapidly decelerating the drive shaft and the spool means, and ramp means for disengaging said first and second teeth from driving engagement during rapid deceleration caused by said decelerating means whereby said guide drum is free to rotate a discrete amount relative to said spool means and to thereby play out a length of filament from said spool means; and biasing means for biasing the guide drum downwardly towards spool means whereby said first and second teeth are biased into driving engagement with one another during normal acceleration and deceleration at rates less than caused by said decelerating means.

22. An apparatus in accordance with claim 21 including stop means for stopping the relative rotation between said guide drum and said spool means during the rapid deceleration caused by said decelerating means after an amount of relative angular rotation between said guide drum and said spool means has taken place.

23. In a vegetation cutting device in which a flexible filament is rotatably driven about a substantially vertical axis with a free end of the filament defining a cutting plane, apparatus for metering discrete lengths of the cutting filament comprising:

driving means for rotatably driving the flexible filament;

driven means selectively coupled to said driving means for selective rotation therewith;

holding means for holding a length of flexible filament, said holding means being coupled to one of said driven and driving means for rotation therewith;

means for metering discrete lengths of filament from said holding means;

said metering means including braking means for rapidly decelerating said driving means, and means for disengaging said driven means from said driving means during rapid deceleration caused by said braking means whereby said driven means is free to rotate a discrete amount relative to said driving means and to thereby play out a length of filament from said holding means; and biasing means for biasing said driven means into driving engagement with said driving means during normal acceleration and deceleration at rates less than caused by said braking means.

24. An apparatus in accordance with claim 23 wherein said driving means includes an electric motor.

25. An apparatus in accordance with claim 24 wherein said braking means includes an electric motor braking mechanism.

* * * * *